(12) United States Patent
Brunetto et al.

(10) Patent No.: US 10,427,225 B2
(45) Date of Patent: Oct. 1, 2019

(54) TANGENTIALLY MOUNTED INDEXABLE CUTTING INSERT WITH SEGMENTED CUTTING EDGE AND TRIANGULAR-SHAPED MARGIN

(71) Applicant: Kennametal Inc., Latrobe, PA (US)

(72) Inventors: Lance David Brunetto, Greensburg, PA (US); Jean Luc Dufour, Greensburg, PA (US); Andreas Lieber, Zirndorf (DE); Xiangdong Fang, Greensburg, PA (US); Qiang Wu, Irwin, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/813,580

(22) Filed: Nov. 15, 2017

(65) Prior Publication Data
US 2019/0143424 A1 May 16, 2019

(51) Int. Cl.
*B23B 27/16* (2006.01)
*B23C 5/20* (2006.01)

(52) U.S. Cl.
CPC ...... *B23C 5/207* (2013.01); *B23C 2200/0433* (2013.01); *B23C 2200/0477* (2013.01); *B23C 2200/0494* (2013.01); *B23C 2200/367* (2013.01)

(58) Field of Classification Search
CPC .......... B23C 2200/0494; B23C 5/1072; B23C 2200/0472; B23C 2210/287; B23C 2200/0433; B23C 2200/203; B23C 2200/367; B23C 5/2247; B23C 2200/0477; B23C 5/207
See application file for complete search history.

(56) References Cited

U.S. PATENT DOCUMENTS

| | | | | |
|---|---|---|---|---|
| 5,383,750 A | * | 1/1995 | Satran | B23C 5/1072 407/113 |
| 5,542,795 A | | 8/1996 | Mitchell | |
| 5,876,160 A | | 3/1999 | Johnson | |
| 6,142,716 A | * | 11/2000 | Jordberg | B23C 5/202 407/114 |

(Continued)

FOREIGN PATENT DOCUMENTS

| | | | | |
|---|---|---|---|---|
| EP | 3050655 A1 | * | 8/2016 | ............. B23C 5/109 |
| JP | WO 2015115379 A1 | * | 8/2015 | ............. B23C 5/109 |
| JP | 2016172294 A | * | 9/2016 | ............... B23C 5/20 |

*Primary Examiner* — Sara Addisu
(74) *Attorney, Agent, or Firm* — Matthew S. Bedsole

(57) ABSTRACT

A cutting insert having two opposing end surfaces, two identical opposing major side surfaces and two identical opposing minor side surfaces. Each end surface has four corners with two lowered corners and two raised corners, the two lowered corners being diagonally opposite each other, the two raised corners being diagonally opposite each other. The cutting insert also includes a major cutting edge formed at an intersection of each major edge and the end surface. A first section of the major cutting edge proximate the raised corner constitutes a leading end of the major cutting edge, and a second section of the major cutting edge proximate the lowered corner constitutes a trailing end of the major cutting edge. An angled margin only partially extends along the leading end of the major cutting edge and segments the major cutting edge.

19 Claims, 7 Drawing Sheets

(56) References Cited

U.S. PATENT DOCUMENTS

| | | | |
|---|---|---|---|
| 6,196,770 B1* | 3/2001 | Astrom | B23C 5/109 |
| | | | 407/114 |
| 7,014,396 B2 | 3/2006 | Satran et al. | |
| 7,040,844 B1 | 5/2006 | Daiguji | |
| 7,063,489 B2 | 6/2006 | Satran | |
| 7,073,987 B2 | 7/2006 | Hecht | |
| 7,094,007 B2 | 8/2006 | Satran et al. | |
| 7,104,735 B2 | 9/2006 | Johnson et al. | |
| 7,104,736 B2 | 9/2006 | Satran et al. | |
| 7,241,082 B2 | 7/2007 | Smilovici et al. | |
| 8,277,153 B2* | 10/2012 | Kovac | B23C 5/06 |
| | | | 407/103 |
| 8,449,230 B2 | 5/2013 | Nguyen et al. | |
| 8,690,494 B2 | 4/2014 | Fang et al. | |
| 9,358,622 B2* | 6/2016 | Ballas | B23C 5/109 |
| 9,993,884 B2* | 6/2018 | Fang | B23C 5/2247 |
| 10,046,398 B2* | 8/2018 | Agic | B23B 27/1662 |
| 2003/0170080 A1* | 9/2003 | Hecht | B23B 27/08 |
| | | | 407/113 |
| 2005/0042044 A1* | 2/2005 | Satran | B23C 5/2213 |
| | | | 407/113 |
| 2005/0063792 A1* | 3/2005 | Satran | B23C 5/1072 |
| | | | 407/113 |
| 2006/0013661 A1* | 1/2006 | Long, II | B23B 27/1622 |
| | | | 407/113 |
| 2013/0121775 A1* | 5/2013 | Dudzinsky | B23C 5/2221 |
| | | | 407/42 |
| 2014/0212228 A1 | 7/2014 | Horiike et al. | |
| 2015/0117969 A1* | 4/2015 | Brunetto | B23C 5/207 |
| | | | 407/42 |
| 2017/0014920 A1* | 1/2017 | Fang | B23C 5/2221 |
| 2017/0066065 A1* | 3/2017 | Burtscher | A61K 31/4741 |

\* cited by examiner

TANGENTIALLY MOUNTED INDEXABLE CUTTING INSERT WITH SEGMENTED CUTTING EDGE AND TRIANGULAR-SHAPED MARGIN

FIELD OF THE INVENTION

In general, the invention relates to a cutting insert, and in particular to a cutting insert for a milling cutter that is tangentially mounted in the cutter pocket with segmented cutting edges and triangular-shaped margins.

BACKGROUND OF THE INVENTION

One problem encountered with a tangentially mounted cutting insert with a straight cutting edge that is held in a pocket with positive axial rake will always leave a "scalloped" shape on the work piece when being used to machine a wall. For any given positive axial rake, the longer the straight cutting edge, the larger the scallop on the wall of the work piece wall. Thus, it would be desirable to provide a cutting insert that will minimize the production of a "scalloped" shape on the work piece.

SUMMARY OF THE INVENTION

The problem of leaving a "scalloped" shape on the work piece is solved by providing a cutting insert with a triangular-shaped margin extending only along the leading end of the main cutting edge. Providing the margin roughly in the shape of a triangle to only the leading end of the cutting edge of the cutting insert when the cutting insert is mounted with a positive axial rake provides extra strength to the portion of the main cutting edge that first enters the work piece. Because the positive axial rake means the cutting action will progress from the leading end of the main cutting edge of the cutting insert when entering the work piece to the rest of the cutting edge after entering the work piece, less support is required on the trailing end of the main cutting edge. This aspect of the invention provides the strength needed to enter the work piece without increasing the pressure and temperature on the cutting insert along the entire main cutting edge.

In one aspect of the invention, a cutting insert comprises two opposing end surfaces, two opposing minor side surfaces extending between the two opposing end surfaces, and two opposing major side surfaces extending between the end surfaces and the minor side surfaces. Each end surface has four corners including two lowered corners and two raised corners. The two lowered corners are diagonally opposite each other, and the two raised corners are diagonally opposite each other. The cutting insert further includes two opposing major edges formed at an intersection of each end surface and the major side surfaces; a major cutting edge formed at an intersection of each major edge and the end surface. A section of the major cutting edge proximate the raised corner constitutes a leading end of the major cutting edge, and a section of the major cutting edge proximate the lowered corner constitutes a trailing end of the major cutting edge. The cutting insert further includes a margin only partially extending along the leading end of the major cutting edge, thereby segmenting the major cutting edge.

In another aspect, a cutting insert comprises two opposing end surfaces, two opposing minor side surfaces extending between the two opposing end surfaces, and two opposing major side surfaces extending between the end surfaces and the minor side surfaces. Each end surface has four corners including two lowered corners and two raised corners. The two lowered corners are diagonally opposite each other, and the two raised corners are diagonally opposite each other. The cutting insert further includes two opposing major edges formed at an intersection of each end surface and the major side surfaces, two opposing minor edges formed at an intersection of each end surface and the minor side surfaces, and two opposing corner edges formed at an intersection of each the corner side surfaces and the major side surfaces. The cutting insert further includes a major cutting edge formed at an intersection of each major edge and the end surface, and a minor cutting edge formed at an intersection of each minor edge and the end surface, and a corner cutting edge formed at an intersection of the major and minor cutting edges. A section of the major cutting edge proximate the raised corner constitutes a leading end of the major cutting edge, and a section of the major cutting edge proximate the lowered corner constitutes a trailing end of the major cutting edge. The cutting insert further includes a margin only partially extending along the leading end of the major cutting edge.

In another aspect, a milling cutter comprises a plurality of insert pockets, wherein the cutting insert of the invention is seated in each of the plurality of insert pockets.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 7:
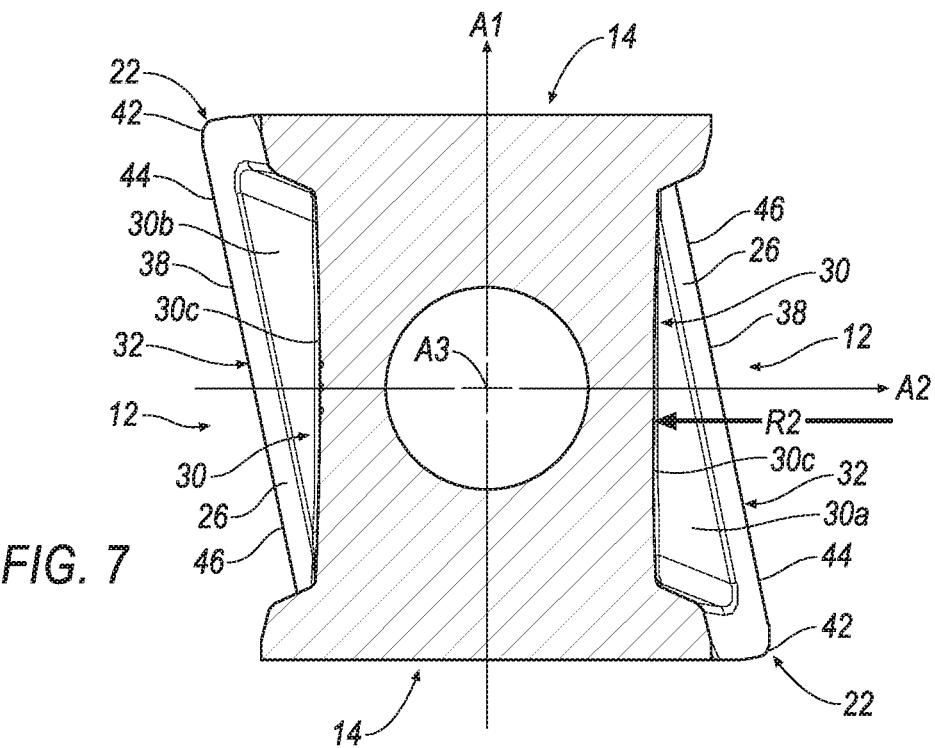
FIG. 7 is a cross-sectional view of the exemplary embodiment of the cutting insert taken along line 7-7 of FIG. 5.
Figure 8:
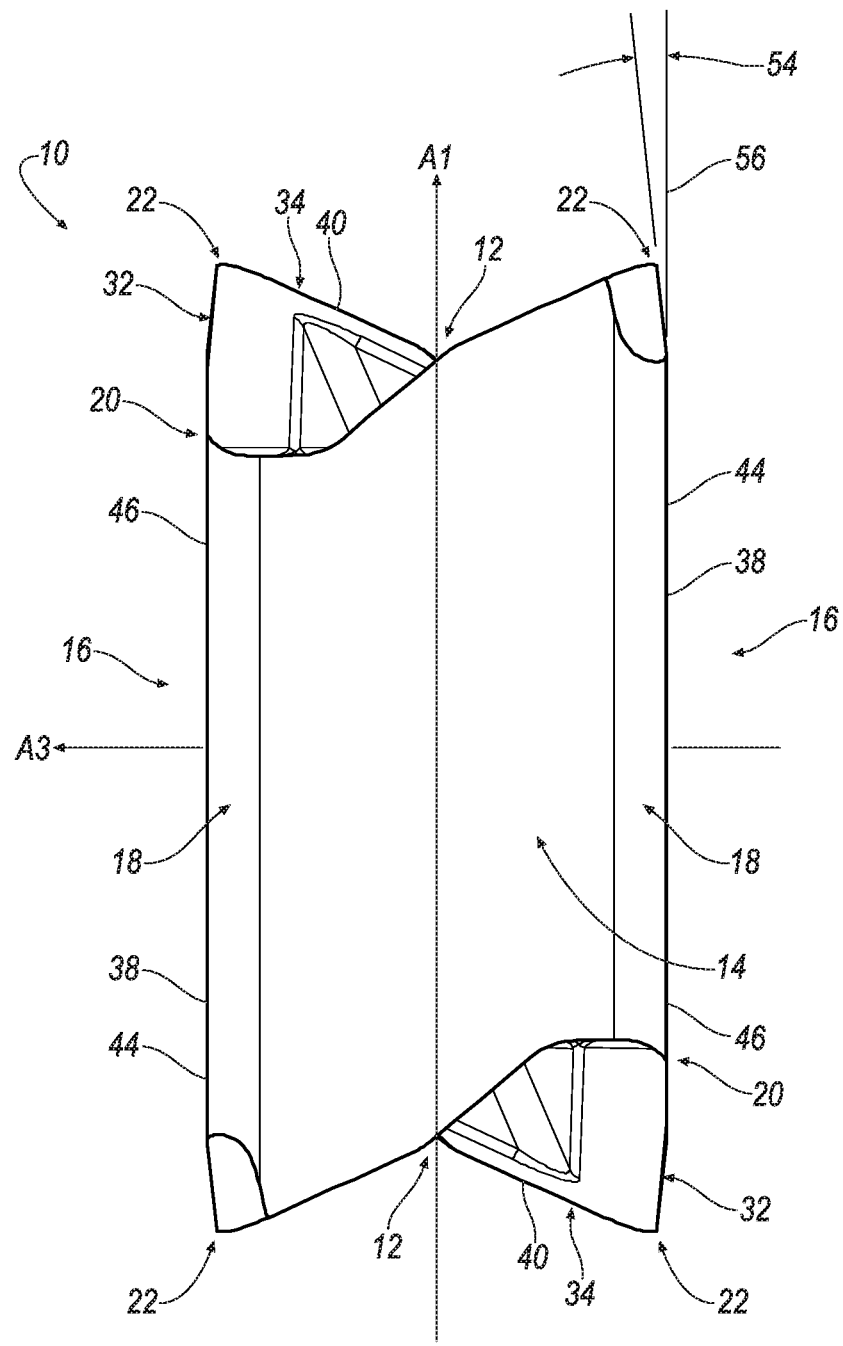
FIG. 8 is a top view of the exemplary embodiment of the cutting insert of FIG. 1.
Figure 9:
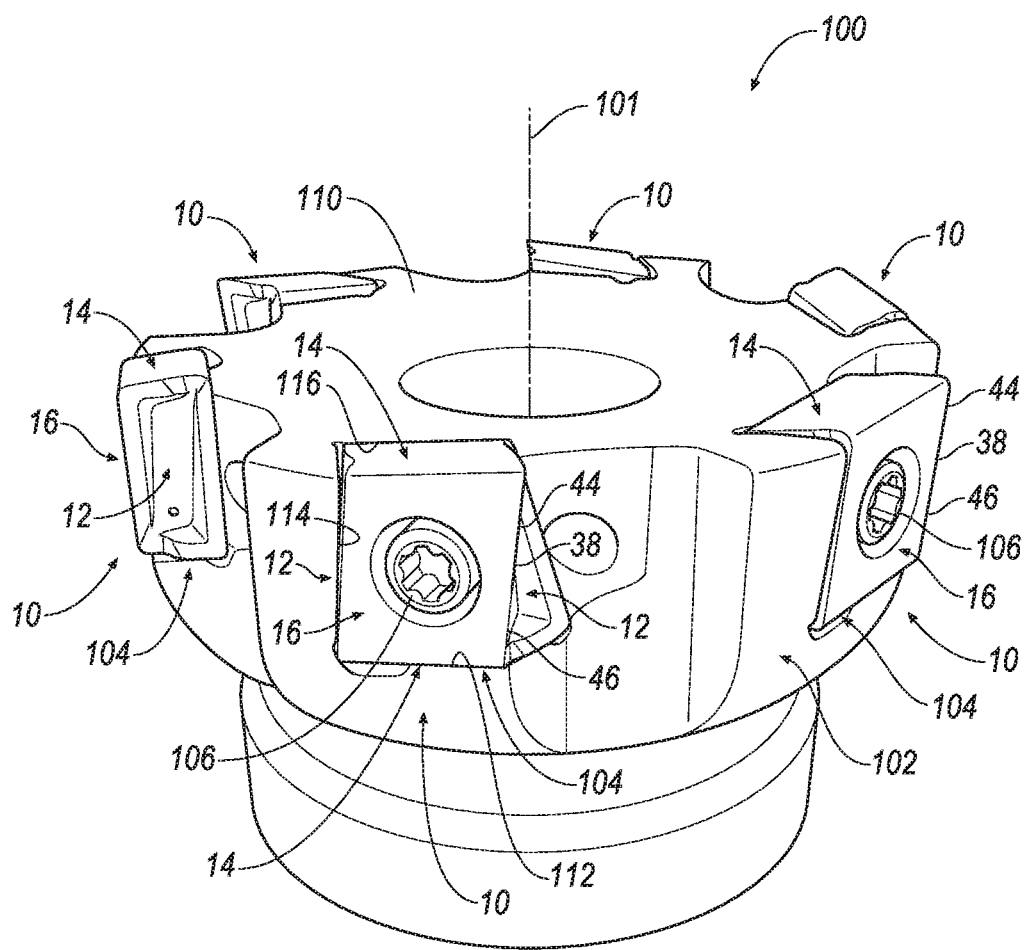
FIG. 9 is an isometric view of an exemplary embodiment of a milling cutter with the cutting insert seated in insert pockets.

Referring now to FIGS. 1-8, a cutting insert 10 is shown according to an embodiment of the invention. In general, the cutting insert 10 is indexable and tangentially mounted in a pocket of a milling cutter 100 (FIG. 9). The cutting insert 10 is typically manufactured by form-pressing and sintering carbide powders using methods well-known in the art. The cutting insert 10 is generally rectangular in shape and has two identical opposing end seating surfaces 12, two identical opposing minor side surfaces 14 extending between the two opposing end seating surfaces 12, two identical opposing major side surfaces 16 extending between the end surfaces 12 and the minor side surfaces 14. Each end surface 12 has 180 degrees rotational symmetry about a first central axis A1 passing through the two end surfaces 12, each minor side surface 14 has 180 degrees rotational symmetry about a second central axis A2 passing through the two minor side surfaces 14, and each major side surface 16 has 180 degrees rotational symmetry about a third central axis A3 passing through the two major side surfaces 16. The second central axis A2 is perpendicular to the first central axis A1, and the third central axis A3 is perpendicular to the first central axis A1 and to the second central axis A2. The cutting insert 10 also includes four opposed corner side surfaces 18 extending between the minor and major side surfaces 14, 16 and the end surfaces 12.

As mentioned earlier, the cutting insert 10 is generally rectangular in shape. As such, the cutting insert 10 has a length, L1, in the direction of the first central axis, A1, and a length, L2, in the direction of the second central axis, A2, wherein the length, L1, is different than the length, L2. In the illustrated embodiment, the length, L1, is relatively larger than the length, L2.

Each end surface 12 has four corners; two diagonally opposite lowered corners 20 and two diagonally opposite raised corners 22. The lowered corners 20 are closer to the second central axis A2 than the raised corners 22. Each corner side surface 18 extends between the raised corner 22 of one of the two opposing end surfaces 12 and the lowered corner 20 of the other one of the two opposing end surfaces 12.

Two opposing major edges 32 are formed at the intersection of each end surface 12 and the major side surfaces 16, two opposing minor edges 34 are formed at the intersection of each end surface 12 and the minor side surfaces 14, and two opposing corner edges 36 are formed at the intersection of each the corner side surfaces 18 and the end surfaces 12. A major cutting edge 38 is formed at the intersection of each major edge 32 and the end surface 12 and extends along substantially the entire length of its associated major edge 32. A minor cutting edge 40 is formed at the intersection of each minor edge 34 and the end surface 14 and extends along its associated minor edge 34. A corner cutting edge 42 is formed at the intersection of the major and minor cutting edges 38, 40. Because the cutting insert 10 is symmetric about all three axes, A1, A2 and A3, the cutting insert 10 has a total of four major cutting edges 38, four minor cutting edges 40 and four corner cutting edges 42.

The portion of the major cutting edge 38 proximate the raised corner 22 constitutes a leading end 44 of the major cutting edge 38, whereas the section of the major cutting edge 38 proximate the lowered corner 20 constitutes a trailing end 46 of the major cutting edge 38, as shown in FIGS. 1-5 and 7. The major cutting edge 38 is formed at an angle 39 with respect to the second axis, A2. The angle 39 may be in the range between about 5 degrees and about 15 degrees. For example, the angle 39 may be about 11.5 degrees.

Figure 5:
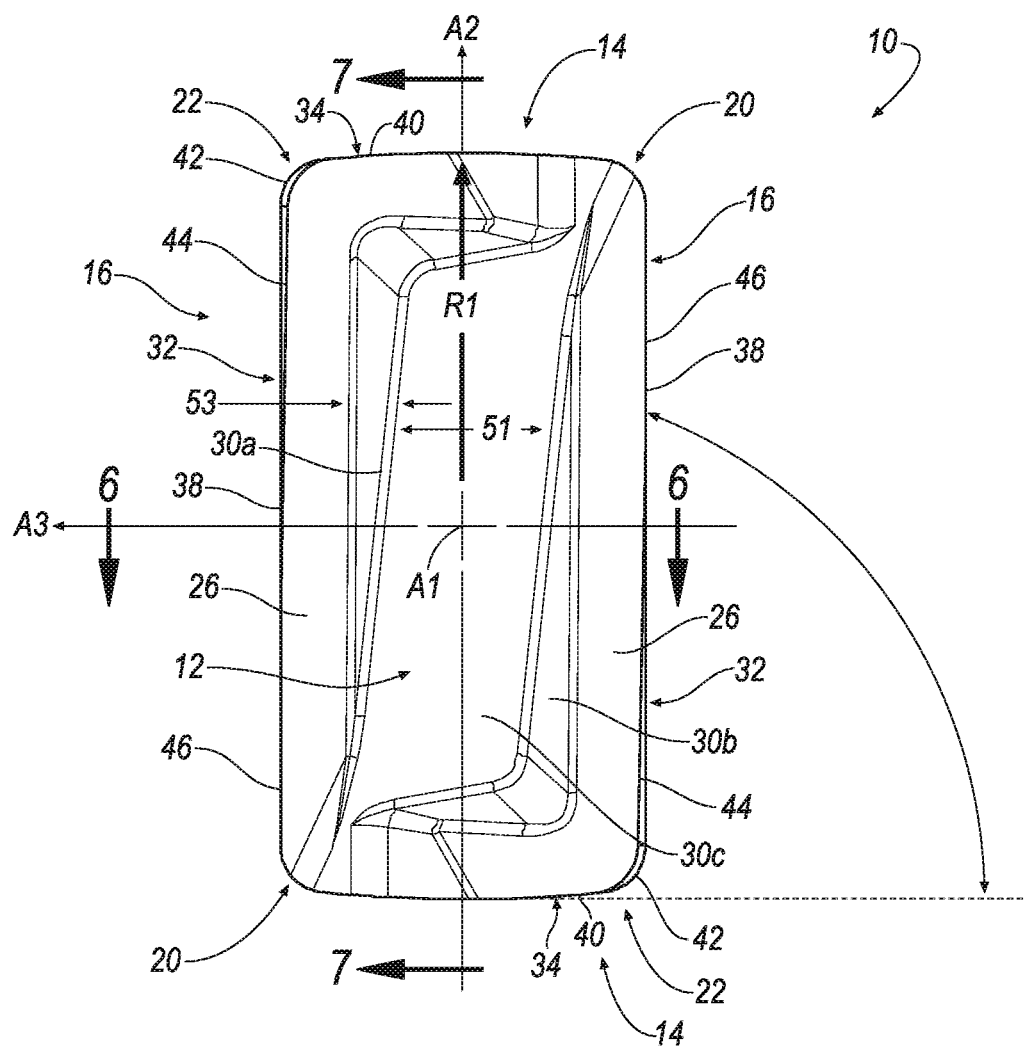
FIG. 5 is a side view of the exemplary embodiment of the cutting insert of FIG. 1.

In one embodiment, each minor side surface 14 is formed with a large radius, R1, as shown in FIG. 5. As a result, each minor side surface 14 has a convex topography. In one embodiment, the radius, R1, is in the range between about 0.75 inches (19.05 mm) to about 1.25 inches (31.75 mm). For example, in the illustrated embodiment, the radius, R1, is about 0.984 inches (25.00 mm). However, it will be appreciated that the invention is not limited by the magnitude of the radius, R1, and that the invention can be practiced with any desirable magnitude of the radius, R1, so long as the minor side surface 14 has a convex topography.

Figure 6:
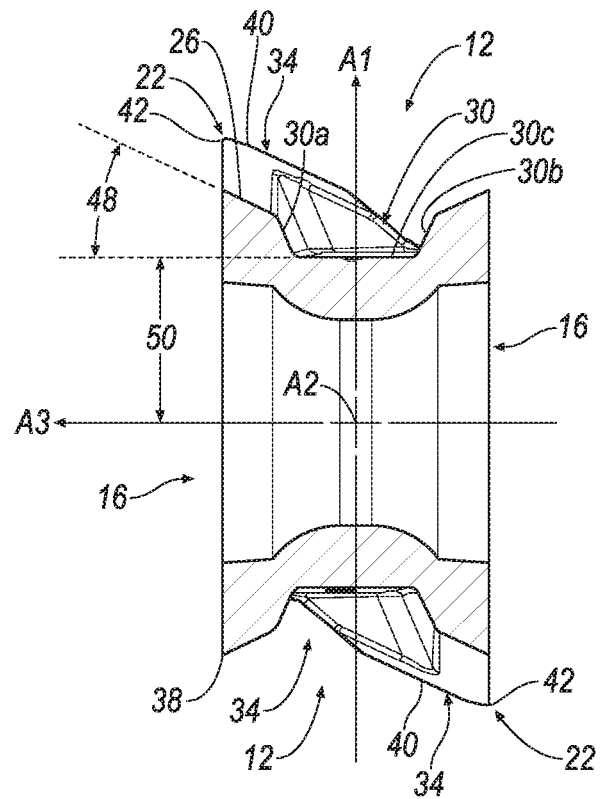
FIG. 6 is a cross-sectional view of the exemplary embodiment of the cutting insert taken along line 6-6 of FIG. 5.

Referring now to FIGS. 6 and 7, each end surface 12 of the cutting insert 10 has a seating surface 30 for contacting a pocket of a cutting tool 100 (FIG. 9) that extends entirely from one lowered corner 20 to the diagonally opposite lowered corner 20 of the cutting insert 10. In the illustrated embodiment, the seating surface 30 is in the form of a U-shaped groove having side support walls 30a, 30b, and a bottom wall 30c formed between the two side support walls 30a, 30b. The two side support walls 30a, 30b extend from the bottom wall 30c to a rake surface 26 extending between the major edge 32 and the side support walls 30a, 30b In one embodiment, the bottom wall 30c is formed with a very large radius, R2. As a result, bottom wall 30c has a concave topography. In one embodiment, the radius, R2, is in the range between about 3.00 inches (76.2 mm) to about 5.00 inches (127.0 mm). For example, in the illustrated embodiment, the radius, R2, is about 3.937 inches (100.00 mm). However, it will be appreciated that the invention is not limited by the magnitude of the radius, R2, and that the invention can be practiced with any desirable magnitude of the radius, R2, so long as the bottom wall 30c has a concave topography.

As shown in FIG. 6, the rake surface 26 is formed at a rake angle 48 with respect to the third central axis A3. The rake angle 48 can be greater than 0 degrees and less than 90 degrees. In the illustrated embodiment, the rake angle 48 is about 25 degrees. However, it will be appreciated that the invention is not limited by the magnitude of the rake angle 48, and that the invention can be practiced with any desirable rake angle.

As shown in FIG. 6, a distance 50 between the bottom wall 30c and the third central axis, A3, remains constant across the entire length of the seating surface 30. In other words, the bottom wall 30c of the seating surface 30 is substantially parallel to the third central axis A3 along its entire length from one lowered corner 20 to the diagonally opposite lowered corner 20.

As shown in FIG. 5, the bottom wall 30c has a substantially constant width 51 along its entire length from one lowered corner 20 to the diagonally opposite lowered corner 20. On the other hand, the side support walls 30a, 30b have a continuously varying width 53 along their entire length from one lowered corner 20 to the diagonally opposite lowered corner 20. Specifically, the width 53 of the side support walls 30a, 30b are inversely proportional to each other. For example, the width of the side support wall 30a is a minimum, while the width 53 of the side support wall 30b is a maximum at the lowered corner 20, and the width 53 of the side support wall 30a is a maximum, while the width 53 of the side support wall 30b is a minimum at the diagonally opposite lowered corner 20. It is noted that the width 53 of each side support wall 30a, 30b is approximately equal to each other where the first central axis, A1, and the third central axis, A3, intersect each other, as shown in FIG. 5.

Referring back now to FIGS. 1 and 2, one aspect of the invention is that the cutting insert 10 includes a margin 52 (i.e., relief surface) roughly in the shape of a triangle extending only along the leading end 44 of each of the major cutting edges 38 for a length, L3, which is approximately equal to the length of the leading end 44 of the major cutting edge 38 (i.e., the cosine of angle 39). The triangular-shaped margin 52 is generally in the form of a right triangle having one leg extending a first length from the raised corner 22 in the direction of the first central axis, A1, and a second leg extending a second length from the raised corner 22 in the direction of the second central axis, A2, and a hypotenuse, which is the longest side of the triangle, connecting the first and second legs.

Figure 1:
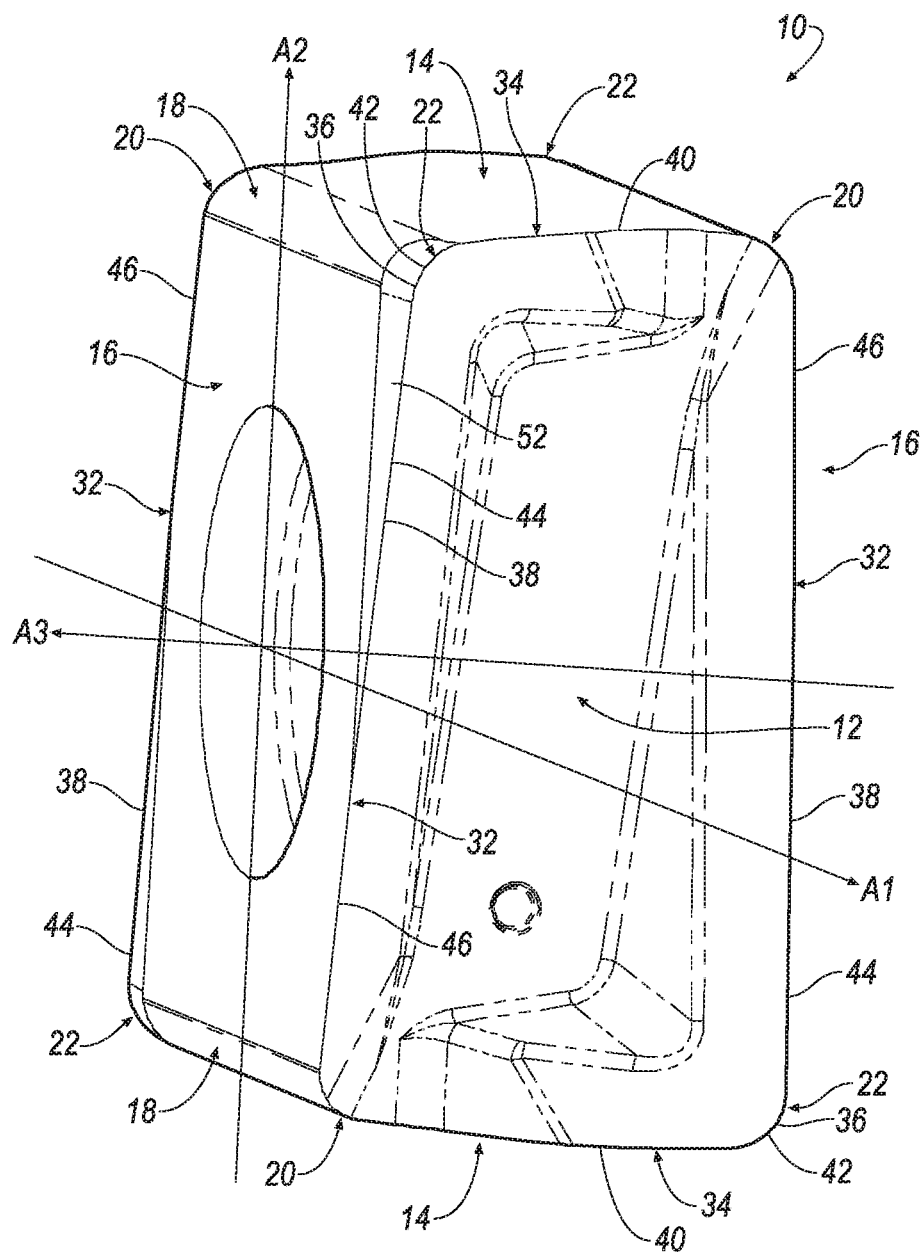
FIG. 1 is an isometric view of an exemplary embodiment of a cutting insert of the invention.
Figure 2:
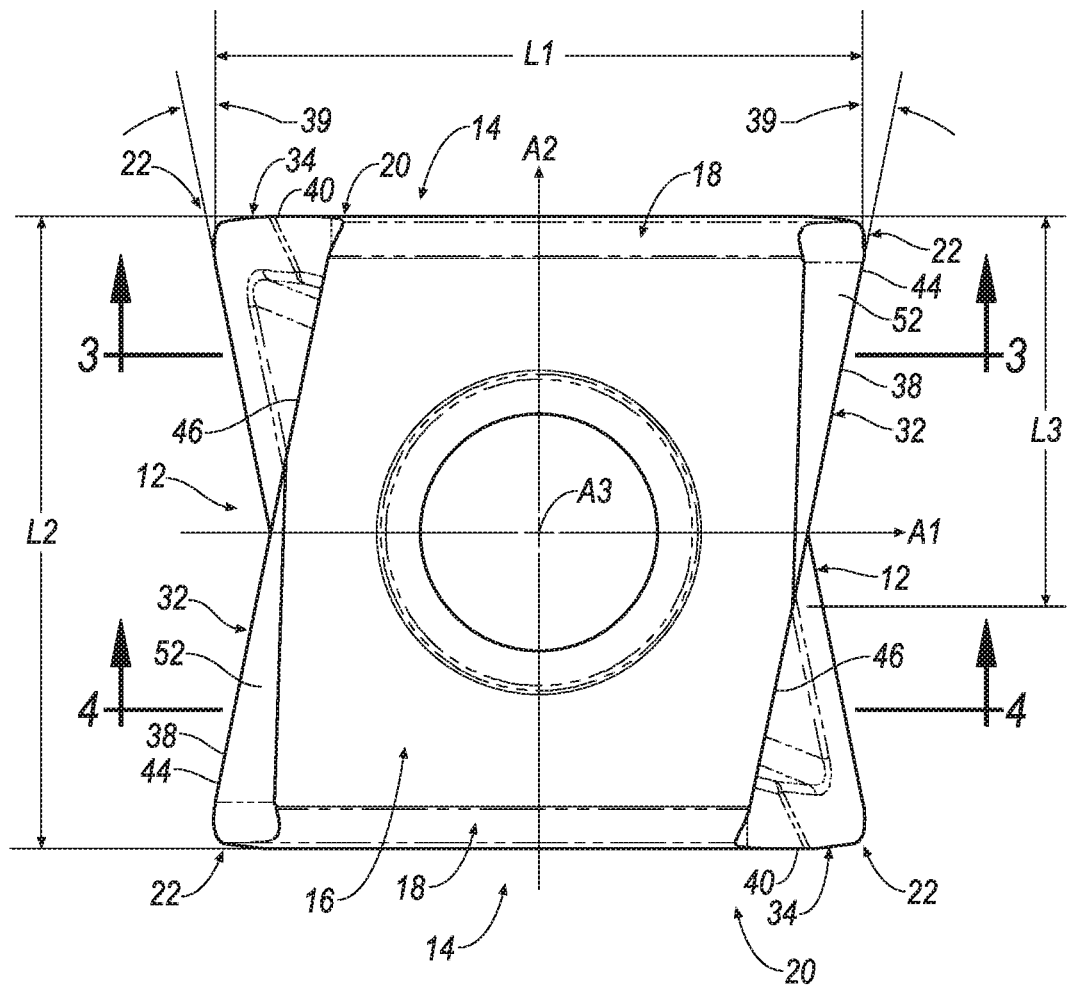
FIG. 2 is a front view of the exemplary embodiment of the cutting insert of FIG. 1.
Figure 3:
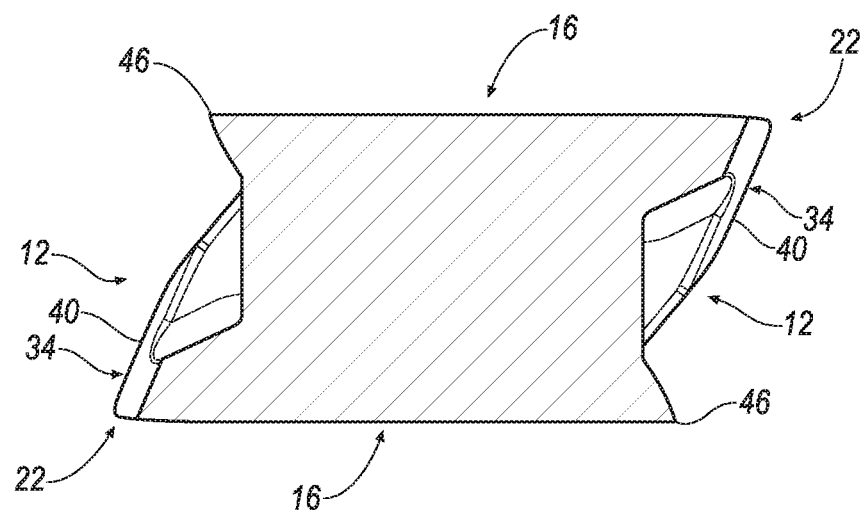
FIG. 3 is a cross-sectional view of the exemplary embodiment of the cutting insert taken along line 3-3 of FIG. 2.
Figure 4:
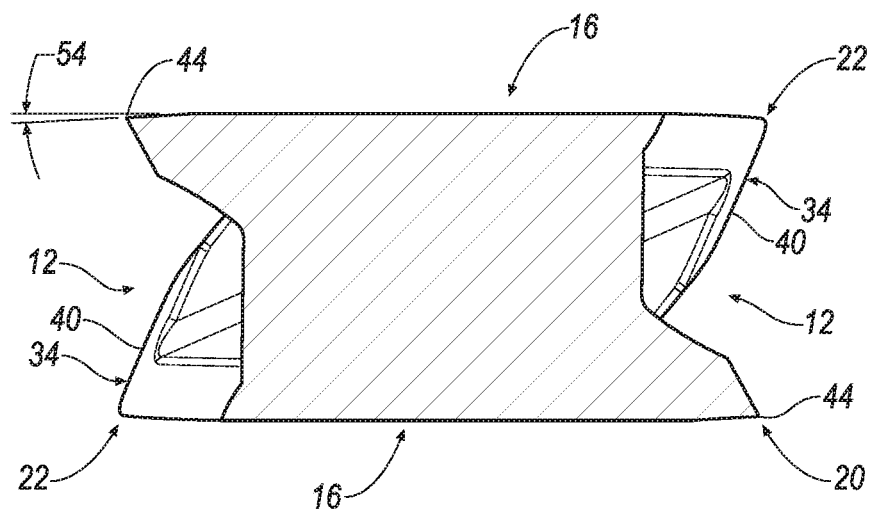
FIG. 4 is a cross-sectional view of the exemplary embodiment of the cutting insert taken along line 4-4 of FIG. 2.

As shown in FIG. 2, the length, L3, is larger than one-half the length, L2. For example, the length, L3, may be about 0.32 inches (8.0 mm) and the length, L2, may be about 0.51 inches (13.0 mm). As shown in FIGS. 4 and 8, the margin 52 is formed at an angle 54 of in a range between greater than 0 degrees and less than 15 degrees with respect to a plane 56 substantially parallel to the first central axis, A1. For example, the angle 54 can be about 6 degrees. However, it will be appreciated that the invention is not limited by the magnitude of the angle 54, and that the invention can be practiced with any non-zero angle 54.

Providing the triangular-shaped margin 52 to only the leading end 44 of the major cutting edge 38 of the cutting insert 10 when mounted with a positive axial rake in the pocket of the milling cutter 100 (FIG. 9) provides extra strength to the portion of the major cutting edge 38 that first enters the work piece. Because the positive axial rake means the cutting action will progress from the leading end 44 of the major cutting edge 38 of the cutting insert 10 when entering the work piece to the rest of the major cutting edge 38 after entering the work piece, less support is required on the trailing end 46 of the major cutting edge 38. This aspect provides the strength needed to enter the work piece without increasing the pressure and temperature on the cutting insert 10 along the entire major cutting edge 38.

Because the margin only extends part of the way along the major cutting edge 38, the major cutting edge 38 is broken into two segments: 1) a leading end 44, and 2) a trailing end 46. The segmented major cutting edge 38 allows the designer to optimize the cutting insert and tool holder geometry to produce a 90-degree wall when stepping down at an axial depth of cut (DOC) equal to the length of the leading end 44 of the major cutting edge 38. The reduced length of the leading end 44 of the major cutting edge 38 means that the scallop left on the work piece wall will be smaller. Also, the trailing end 46 of the major cutting edge 38 is oriented as to be clear of the cut when machining along a wall of the work piece, but still function normally when not being used to produce a wall.

Referring now to FIG. 9, a milling cutter 100 is shown according to an embodiment of the invention. The milling cutter 100 has an axis of rotation 101, and a cutter body 102 with a plurality of insert pockets 104. In each insert pocket 104, the cutting insert 10 of the invention is tangentially mounted to the cutter body 102 by means of a clamping screw 106. As can be seen, each cutting insert 10 is seated so that there is a clearance between a workpiece (not shown) and the minor side surface 14 of the cutting insert 10 and the face 110 of the milling cutter 100.

The insert pocket 104 includes a first side wall 112 and a second side wall 114 generally transverse to a bottom wall 116. Each wall 112, 114, 116 is generally planar. When seated in the insert pocket 104, one of the minor side surfaces 14 of the cutting insert 10 engages the first side wall 112, one of the end surfaces 12 engages the second side wall 114, and one of the major side surfaces 16 of the cutting insert 10 engages the bottom wall 116 of the insert pocket 104.

As mentioned earlier, providing the margin 52 roughly in the shape of a triangle extending only along the leading end 44 of the major cutting edge 38 of the cutting insert 10 when mounted with a positive axial rake provides extra strength to the portion of the major cutting edge 38 that first enters the work piece. Because the positive axial rake means the cutting action will progress from the leading end 44 of the major cutting edge 38 of the cutting insert 10 when entering the work piece to the rest of the major cutting edge 38 after entering the work piece, less support is required on the trailing end 46 of the major cutting edge 38. This aspect provides the strength needed to enter the work piece without increasing the pressure and temperature on the cutting insert 10 along the entire major cutting edge 38.

The segmented major cutting edge 38 allows the designer to optimize the cutting insert and tool holder geometry to produce a 90-degree wall when stepping down at an axial depth of cut (DOC) equal to the height of the leading end 44 of the major cutting edge 38 (i.e., the length L3). The reduced length of the leading end 44 of the major cutting edge 38 means that the scallop left on the work piece wall will be smaller. Also, the trailing end 46 of the major cutting edge 38 is oriented as to be clear of the cut when machining along a wall of the work piece, but still function normally when not being used to produce a wall.

The patents and publications referred to herein are hereby incorporated by reference.

Having described presently preferred embodiments the invention may be otherwise embodied within the scope of the appended claims.

What is claimed is:

1. A cutting insert, comprising:
   two opposing end surfaces, two opposing minor side surfaces extending between the two opposing end surfaces, two opposing major side surfaces extending between the end surfaces and the minor side surfaces, each end surface having four corners comprising two lowered corners and two raised corners, the two lowered corners being diagonally opposite each other, the two raised corners being diagonally opposite each other;
   two opposing major edges formed at an intersection of each end surface and the major side surfaces;
   a major cutting edge formed at an intersection of each major edge and the end surface, wherein a first section of the major cutting edge proximate the raised corner defines a leading end of the major cutting edge, and wherein a second section of the major cutting edge proximate the lowered corner defines a trailing end of the major cutting edge; and
   a margin extending only along the leading end of the major cutting edge, thereby segmenting the major cutting edge.

2. The cutting insert of claim 1, wherein the margin is triangular-shaped.

3. The cutting insert of claim 1, wherein the margin is formed at an angle of greater than zero degrees and less than 15 degrees with respect to a plane parallel to a first central axis A1.

4. The cutting insert of claim 1, wherein each end surface includes a seating surface that extends from one lowered corner to the diagonally opposite lowered corner.

5. The cutting insert of claim 4, wherein the seating surface is in the form of a U-shaped groove having a first side support wall, a second side support wall and a bottom wall therebetween.

6. The cutting insert of claim 5, wherein the bottom wall is formed with a radius, R2, such that the bottom wall has a concave topography.

7. The cutting insert of claim 5, wherein the bottom wall has a constant width.

8. The cutting insert of claim 1, wherein each minor side surface is formed with a radius, R1, such that each minor side surface has a convex topography.

9. The cutting insert of claim 5, further comprising a rake surface extending between the first and second side support walls and the major edge, wherein the rake surface is formed at an angle with respect to a central axis A2 passing through the minor side surfaces of the cutting insert.

10. The cutting insert of claim 9, wherein the first and second side support walls have a continuously varying width.

11. The cutting insert of claim 1, further comprising two opposing minor edges formed at an intersection of each end surface and the minor side surfaces, and two opposing corner edges formed at an intersection of each the corner side surfaces and the major side surfaces.

12. The cutting insert of claim 1, wherein each minor side surface has 180-degree rotational symmetry about a central axis, A2, passing through the two minor side surfaces.

13. The cutting insert of claim 1, wherein each major side surface has 180-degree rotational symmetry about a central axis, A3, passing through the two major side surfaces of the cutting insert, and wherein a central axis, A2, is perpendicular to a central axis, A1, passing through the two end surfaces, and the central axis, A3, is perpendicular to the central axis, A1, and to the central axis, A2.

14. The cutting insert of claim 1, further comprising four opposed corner side surfaces between the minor and major side surfaces and the end surfaces.

15. The cutting insert of claim 1, further comprising a minor cutting edge formed at an intersection of each minor edge and the end surface, and a corner cutting edge formed at an intersection of the major and minor cutting edges.

16. A cutting insert, comprising:
two opposing end surfaces, two opposing minor side surfaces extending between the two opposing end surfaces, two opposing major side surfaces extending between the end surfaces and the minor side surfaces, each end surface having four corners comprising two lowered corners and two raised corners, the two lowered corners being diagonally opposite each other, the two raised corners being diagonally opposite each other;
two opposing major edges formed at an intersection of each end surface and the major side surfaces, two opposing minor edges formed at an intersection of each end surface and the minor side surfaces, and two opposing corner edges formed at an intersection of each the corner side surfaces and the major side surfaces; and
a major cutting edge formed at an intersection of each major edge and the end surface, and a minor cutting edge formed at an intersection of each minor edge and the end surface, and a corner cutting edge formed at an intersection of the major and minor cutting edges, wherein a first section of the major cutting edge proximate the raised corner defines a leading end of the major cutting edge, and wherein a second section of the major cutting edge proximate the lowered corner defines a trailing end of the major cutting edge; and
a margin extending only along the leading end of the major cutting edge, thereby segmenting the main cutting edge.

17. The cutting insert of claim 16, wherein the margin is triangular-shaped.

18. The cutting insert of claim 16, wherein the margin is formed at an angle of greater than zero degrees and less than 15 degrees with respect to a plane parallel to a first central axis A1.

19. A milling cutter, comprising:
a plurality of insert pockets; and
a cutting insert in accordance with claim 1 seated in each of the plurality of insert pockets.

* * * * *